United States Patent [19]

Tiepke

[11] Patent Number: 4,631,391
[45] Date of Patent: Dec. 23, 1986

[54] ELECTRICAL HEATING DEVICE, ESPECIALLY FOR MIRRORS

[75] Inventor: Günter Tiepke, Schnaittach, Fed. Rep. of Germany

[73] Assignee: Stettner & Co., Lauf, Fed. Rep. of Germany

[21] Appl. No.: 622,948

[22] Filed: Jun. 21, 1984

[51] Int. Cl.[4] .......................... H05B 1/02; H05B 3/00; B60R 1/06; H01C 1/148
[52] U.S. Cl. .................................... 219/541; 219/219; 219/505; 219/530; 219/537; 219/544; 338/22 R; 338/328
[58] Field of Search ............... 219/219, 203, 504, 505, 219/530, 540, 544, 222, 241, 541, 537; 338/22 R, 328

[56] References Cited

U.S. PATENT DOCUMENTS

| | | | |
|---|---|---|---|
| 3,748,439 | 7/1973 | Ting et al. | 338/22 R |
| 4,237,366 | 12/1980 | Berg | 219/219 |
| 4,242,567 | 12/1980 | Carter | 219/505 X |
| 4,327,282 | 4/1982 | Nauerth | 219/505 X |
| 4,401,885 | 8/1983 | Ishii et al. | 219/505 X |
| 4,404,463 | 9/1983 | Eder et al. | 219/219 X |
| 4,410,790 | 10/1983 | Berg et al. | 219/219 |
| 4,426,573 | 1/1984 | Fudickar et al. | 219/505 X |

FOREIGN PATENT DOCUMENTS

| | | | |
|---|---|---|---|
| 2919968 | 11/1980 | Fed. Rep. of Germany | 219/219 |
| 3041597 | 6/1982 | Fed. Rep. of Germany | 219/222 |
| 3042419 | 8/1982 | Fed. Rep. of Germany | 219/219 |
| 3147494 | 6/1983 | Fed. Rep. of Germany | 219/219 |
| 139140 | 10/1979 | Japan | 219/505 |
| 2064927 | 6/1981 | United Kingdom | 219/219 |

*Primary Examiner*—A. Bartis
*Attorney, Agent, or Firm*—Jordan and Hamburg

[57] ABSTRACT

An electrical heating device for a mirror includes a pair of electrically conductive heating lining plates providing for heat distribution on a mirror, and electrical conductors connected to the plates for connecting the plates to a source of power. An insulating layer is disposed between the plates, the insulating layer having openings, and PTC resistor platelettes disposed in the openings and in electrical contact with the pair of plates. One of the plates has a larger area than the insulating layer such that an outer peripheral edge portion of the one plate is spaced outwardly of the outer peripheral edge of the insulating layer, the other of the pair of plates not being larger in area than the insulating layer. The larger of the plates is adapted to be adhered to the backside of a mirror glass for defogging and demisting the mirror.

5 Claims, 5 Drawing Figures

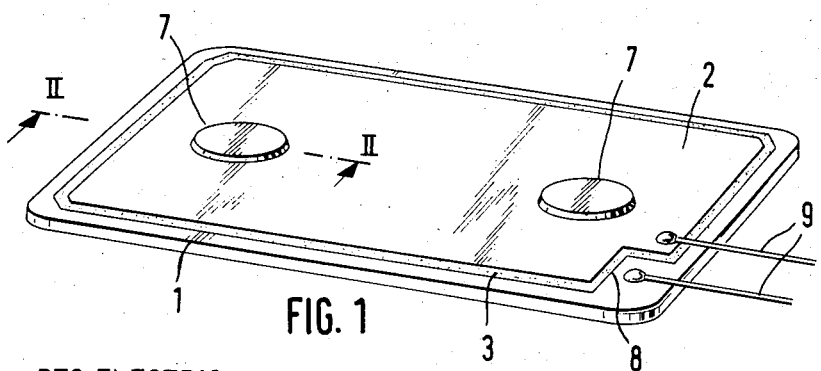
FIG. 1
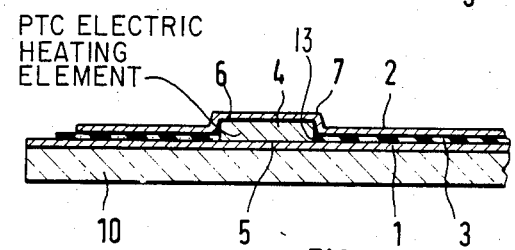
FIG. 2
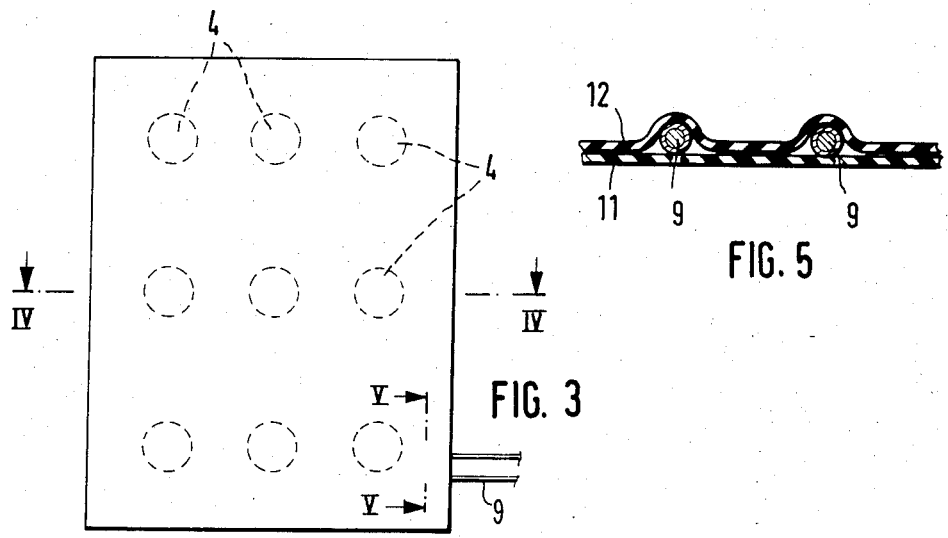
FIG. 3
FIG. 5
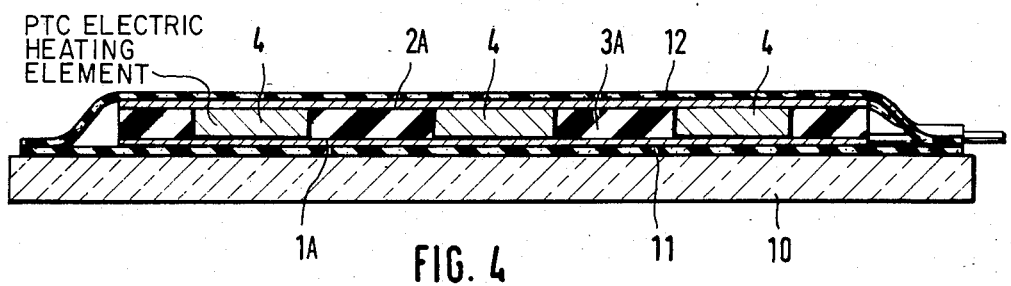
FIG. 4

ELECTRICAL HEATING DEVICE, ESPECIALLY FOR MIRRORS

BACKGROUND OF THE INVENTION

The invention concerns an electrical heating device for glass plates, especially mirror glass, by means of a multisectional, preferably metallic electrically conductive heating lining, which serves for heat distribution, whereby between the overlapping sections of the heating lining, which are insulated from each other and provided with electrical contacts, there are provided PTC resistor platelettes which come into direct contact with the sections on the top and on the bottom.

A heating device of this kind has become known from the German Pat. No. 29 19 968, which describes a heating device for outside mirrors of motor vehicles, which is provided with a bipartite configured metal lining made of aluminum sheet. Both parts of the lining partially overlap, whereby the platelette-shaped PTC resistors are disposed in the overlapping part of the lining. Current is supplied via the two tin plates of which each is provided with a tip-stretched electrical flat plug. This configuration provides a conductive adhesive as a mechanical connection between the heating resistors and the two tin plates. Furthermore, the two tin plates are adhered next to each other on the backside of a mirror by interposing a heating resistor. This kind of installation, however, has the disadvantage, that the actual heating cannot be accomplished independently, as is required in the production or during shipment, i.e. before the adhering on the mirror. In addition to the resulting low mechanical cohesion of the heating configuration, there is the further essential disadvantage, that on the rear of the mirror lining, potential differences are applied, which cause equalizing currents in the mirror lining, and thereby cause the mirror to become gradually blind. This danger is all the greater, because nowadays, mirrors of this kind no longer are provided with a lacquer coating as before, so that the chrome layer, which constitutes the actual mirror lining, is separated only by the adhesive film from the metal foil on which are applied potential differences.

In order to avoid this difficulty, it has already been proposed in German Utility Model No. 81 25 567 to provide a single large area metal foil, and to form the second overlapping metal lining by a current bridge which, separated by an insulation layer, is disposed on the backside of the large area metal lining. This configuration, however, requires constructionally complicated, and operationally not very satisfactorily mounting and contact brackets in order to reach the electrical contacts of the PTC platelettes. This configuration results in a very complicated construction, especially if a rivet joint is provided between the electrical connection brackets and the metal lining.

The German Utility Model No. 82 21 422 does provide a simpler mechanical construction of a mirror heating device by providing notches in the heating lining in which an insulated bracket can be positioned which makes contact with the PTC platelettes positioned directly on the heating lining. In this variant, however, there again is the main disadvantage of occurring potential differences on the backside of the mirror which, based on galvanic processes due to the equalizing currents, causes the mirror gradually to become blind.

The object of the invention is to provide an electrical heating device for glass plates, especially of mirrors, which is simple to produce, sturdy in use, which fits flexibly into unevenness and on curvatures of the glass plate surfaces, and which finally quantitatively avoids the difficulties of equalizing currents, i.e. the danger of causing the mirror to become blind.

For attaining the objective, in the initially mentioned embodiment of the heating device, it is provided that over the first heating lining which has to be heated, there is an insulation layer with openings for the PTC platelettes. On the insulation layer, there is disposed a large area second heating lining, which essentially overlaps the first heating lining.

Extremely simple production coupled with a flexible, mechanically very strong construction is achieved by avoiding great connecting bridges for making contact with the bottom or the top of the PTC platelettes, and by providing two, essentially equally large metal linings, between which the PTC platelettes can be arranged furthermore in random number and configuration.

Production can, for instance, very simply be achieved, whereby an insulation film provided with a double-sided adhesive coating is taped as an insulation layer on the backside of the first heating lining, whereby the PTC platelettes provided with a double-sided adhesive coating are pressed into the openings of this insulation film, and that on top thereof subsequently is positioned the second large area metal lining in the form of a copper, aluminum foil or the like. By providing an opening on the corner of the upper heating lining, there results the simple possibility of soldering the electrical connection wires to the heating linings. The large area adhesive bonding of both metal linings means that the electrical contact points between the frontal area of the PTC platelettes and the heating linings do not have to assume any mounting function, because the entire mechanical mounting is achieved by the large area adhesive bond. Accordingly, in the configuration of the invention, contact adhesive also can be utilized without problems between the PTC platelettes and the heating linings, without thereby encountering the difficulties that have been described in connection with German Pat. No. 29 19 968. The upper heating lining which has to be connected with the second pole of the source of current, comes nowhere into contact with the surface of the glass that has to be heated. Therefore by utilization of a heating configuration for heating mirrors according to the invention, compensating currents cannot occur, and thereby the danger of mirrors going blind is quantitatively avoided. All that is needed for patching a desired number and distribution of PTC resistors is solely the provision of corresponding punched openings in the insulation film, which can be achieved without substantial costs. In comparison thereof, in a configuration according to German Pat. No. 29 19 968, an even greater separation of the lining into unit sections would have to be effected, which finally would only cause that such a multisectional lining held together only via the PTC platelettes would become unmanageable. In a configuration according to German Utility Model No. 81 25 567, purely mechanically speaking, an extremely complicated construction would result, and even then, it would not constitute a random distribution of PTC platelettes on the heating lining, which would correspondingly be able to affect the defrosting image of a mirror.

In a configuration according to German Utility Model No. 82 21 422, there also can only be realized certain distributions of the PTC in a mechanically acceptable construction whereby, however, there still remains the essential difficulty of the thereby extensively occurring equalizing currents in the mirror lining.

The above discusses a very simple construction possibility of a heating device for glass plates, especially mirrors. According to the invention, the possibility of utilizing contact adhesive as an electrical conductive connection of the PTC platelettes with the heating lining has considerable construction technical advantages in comparison to soldering. And finally this permits also the special construction with two large area heating linings which, in addition to the already mentioned mechanical advantages, also results in an optimal heat distribution by the greatest possible avoidance of the so-called "dog-bone-effect" in the thawing image of the mirror. Furthermore, the missing soldering also has the advantage that the connecting wires can even subsequently be soldered to the heating linings, and that thereby no complicated flat plug configurations have to be utilized.

Especially in batter-supplied heating of motor vehicle outside mirrors, during which only relatively low voltage occurs, so that therefore also the insulation film between both heating linings can be configured relatively thin, it is advantageous to provide the upper heating lining with indentations for the PTC platelettes. By means of these indentations, the varying thickness of the PTC platelettes is compensated respective to the insulation material film. It furthermore causes a special embedding and thereby mechanical holding.

Furthermore it would be possible, in a configuration preferably especially for heating devices powered by line voltage, for example for aquariums or bathroom mirrors, to choose the thickness of the insulation layer so that it corresponds to the thickness of the PTC platelettes. In this case, both heating linings can be configured as entirely flat metal plates. The thick insulation layer, which again preferably consists of a correspondingly thick plastic film, which is provided with a double-sided adhesive coating, provides sufficient insulation between the heating linings to which are applied the potential differences.

In a further configuration of the invention, it can especially advantageously be provided that the heating device is embedded between two thermally good conductive insulation material films, i.e. that it is welded in. In this way is obtained a mat-shaped heating device which is completely insulated on all sides, which especially in operation with line voltage, as is advantageous for very large bathroom mirrors, allows not only an extremely simple installation behind the mirror, but also does not require a safety insulation transformer, because even if the mirror falls down and shatters, the danger of exposing current charged metal parts does not exist.

SUMMARY OF THE INVENTION

An electrical heating device for a mirror includes a pair of electrically conductive heating lining plates providing for heat distribution on a mirror, and electrical conductors connected to the plates for connecting the plates to a source of power. An insulating layer is disposed between the plates, the insulating layer having openings, and PTC resistor platelettes disposed in the openings and in electrical contact with the pair of plates. One of the plates has a larger area than the insulating layer such that an outer peripheral edge portion of the one plate is spaced outwardly of the outer peripheral edge of the insulating layer, the other of the pair of plates not being larger in area than the insulating layer.

Further advantages, characteristics and particularities of the invention result from the following description of several exemplified embodiments, as well as from the drawings.

BRIEF DESCRIPTION OF THE DRAWINGS

FIG. 1 is a perspective view of a heating device, especially for heating morot vehicle outside mirrors, according to one embodiment of the invention;

FIG. 2 is a partial sectional view taken along the line II—II of FIG. 1;

FIG. 3 is a rear view of an electrical heating device for a large area glass plate, especially for bathroom mirror heating, with a multitude of cold conductor platelettes;

FIG. 4 is an enlarged sectional view taken along the line IV—IV in FIG. 3; and

FIG. 5 is a sectional view taken along the line V—V in FIG. 3.

DESCRIPTION OF THE PREFERRED EMBODIMENTS

The motor vehicle mirror heating device illustrated in FIGS. 1 and 2 includes a first electrically conductive heating lining 1, for instance in the form of a copper or aluminum foil, and a second, only slightly smaller electrically conductive heating lining 2, which is disposed over the first heating lining, interfaced by double-sided, adhesive-coated insulation film 3. The insulation film 3 is provided in two places with spaced openings 13 into which are positioned PTC platelettes 4, whereby the bottom frontal area 5 and the top frontal area thereof 6 make direct electrical contact respectively with the heating lining 1 and the upper heating lining 2. This is accomplished mainly by utilizing a contact adhesive. The embossment 7 of the upper heating lining serves to compensate for the differences in thickness between the insulation film 3 and the PTC platelette 4. The upper heating lining 2 and the insulation film 3 are provided with a notch 8 in a corner which exposes the surface of the bottom heating lining 1 so that connection wires 9 can simply be soldered on the linings 1 and 2 as shown. The numeral 10 schematically indicates a glass plate, preferably a mirror, which has to be heated. The heating device is adhered to the backside of the mirror on which the mirror lining is disposed.

In the exemplified embodiment of FIGS. 3 to 5 of a heating device according to the invention, there is shown a variation of the embodiment of FIGS. 1 and 2 and which provides for a multitude of PTC platelettes 4 which would only be necessary for motor vehicle outside mirrors in special exceptional cases. For the latter, usually two PTC platelettes are sufficient for achieving the necessary heating performance for removing dew and for defrosting the mirror. In a larger area heating, for example aquariums or bathroom mirrors, however, a multitude of PTC platelettes are required, whereby the essential construction of a heating device according to the invention allows for a random distribution of the PTC platelettes over the area of the heating linings. As can be seen in FIG. 4, the insulation film 3A is equally thick as the PTC platelettes 4 so that embossments 7 are no longer required and both heating linings 1A and 2A can be entirely flat metal plates. Such a thickness of several mm of the insulation film 3A allows sufficient insulation between the linings 1A and 2A even in the case of operation with line voltage, as is especially required for bathroom mirror heating. The entire heating device, according to FIGS. 3 to 5, is fused together on its outer overlapping borders so that an embedded, very manageable heating mat results, which due to its flexibility and its complete insulation is extremely easily manageable and can be independently mounted on the rear of mirrors. The illustrated construction allows for a simple soldering of the contact wires 9 to the linings 1A and 2A, which are furthermore mechanically secured through the fused borders of insulation films 11 and 12 and which thus provide a sort of pull-out protection.

I claim:

1. An electrical heating device for a mirror comprising a pair of electrically conductive heating lining plates providing for heat distribution on a mirror, electrical conductors connected to said plates for connecting said plates to a source of power, an insulating layer disposed between said plates, said electrical insulating layer having openings, and PTC resistor platelettes disposed in said openings and in electrical contact with said pair of plates, one of said plates having a larger area than said insulation layer such that the entire outer peripheral edge portion of said one plate is spaced outwardly of the outer peripheral edge of said insulating layer the other of said pair of plates not being larger in area than said insulating layer.

2. An electrical heating device according to claim 1, wherein each of said pair of plates is made of a single piece of material.

3. An electrical heating device according to claim 1, wherein one of said plates is provided with embossments for receiving said PTC resistor platelettes.

4. An electrical heating device for a mirror comprising a pair of electrically conductive heating lining plates providing for heat distribution on a mirror, electrical conductors connected to said plates for connecting said plates to a source of power, an insulating layer disposed between said plates, said electrical insulating layer having openings, and PTC resistor platelettes disposed in said openings and in electrical contact with said pair of plates, said insulating layer having a larger area than one of said plates such that the entire outer peripheral edge portion of said one plate is spaced inwardly of the outer edge of said insulation layer, said other plate having a larger area than said insulating layer such than the entire outer peripheral edge portion of said other plate is spaced outwardly of the outer edge of said insulating layer such that the outer peripheral edge portions of said one plate, said insulating layer and said other plate are progressively staggered.

5. An electrical heating device for a mirror comprising, a pair of electrically conductive heating lining plates providing for heat distribution, one of said plates being adapted to be adhered to the back side of a mirror, electrical conductors connected to said plates for connecting said plates to a source of power, an insulating layer disposed between said plates, said insulating layer having openings, and PTC resistor platelettes disposed in said openings and in electrical contact with said pair of plates, said one plate having a larger area than said insulating layer such that the entire outer peripheral edge portion of said one plate is spaced outwardly of the outer peripheral edge of said insulating layer, the other of said pair of plates not being larger in area than said insulating layer.

* * * * *